United States Patent
Foster

[11] Patent Number: 6,056,113
[45] Date of Patent: May 2, 2000

[54] DRIVE BEAM TO DRIVE UNIT CONNECTIONS

[76] Inventor: Raymond Keith Foster, P.O. Box 1, Madras, Oreg. 97741

[21] Appl. No.: 09/416,736

[22] Filed: Oct. 13, 1999

[51] Int. Cl.[7] .................................................. B65G 25/04
[52] U.S. Cl. ..................................... 198/750.5; 198/750.6
[58] Field of Search ............................ 198/750.5, 750.6, 198/750.7

[56] References Cited

U.S. PATENT DOCUMENTS

| | | | |
|---|---|---|---|
| 5,390,781 | 2/1995 | Foster | 198/750.7 |
| 5,638,943 | 6/1997 | Foster | 198/750.5 |
| 5,799,778 | 9/1998 | Quaeck | 198/750.5 |

*Primary Examiner*—James R. Bidwell
*Attorney, Agent, or Firm*—Delbert J. Barnard

[57] ABSTRACT

In the drive assembly (10) of a reciprocating slat conveyor, three transverse drive beams (28, 30, 32) extend over and across three piston rods (22, 24, 26). The drive beams (28, 30, 32) have side flanges (74, 76) in which three pairs of downwardly opening recesses (78, 84, 80, 86, 82, 88) are formed. One pair of recesses (80, 86) receive upper portions of a first piston rod (22). The other two pairs of recesses (78, 84, 82, 88) receive plastic bearings (90) through which the other two piston rods (24, 26) extend. Each drive beam flange (74, 76) is provided with a cap member (142). Each cap member (142) includes an upwardly directed recess for each downwardly directed recess in its drive beam flange (74, 76). Bolts (144) extend through openings in the cap members (142) and thread into internally threaded openings in the drive beam flanges (74, 76). Each piston rod (22, 24, 26) is provided with a member (70) which provides radially upwardly projecting pairs of flanges (100, 102) between which the drive beam flanges (74, 76) are situated. This provides an interlock structure that connects the piston rods (22, 24, 26) to the drive beams (28, 30, 32) so that piston rod motion is transmitted to the drive beams (28, 30, 32). As each drive beam (28, 30, 32) moves front to rear along with its piston rod (22, 24, 26), it slides relatively along the other two piston rods that are situated in bearings (90) that are carried by the moving drive beam. The engagement of the drive beams (28, 30, 32) with the piston rods (22, 24, 26) via the bearings (90) results in each drive beam (28, 30, 32) being braced from the other two piston rods against yaw, pitch and roll movement.

26 Claims, 12 Drawing Sheets

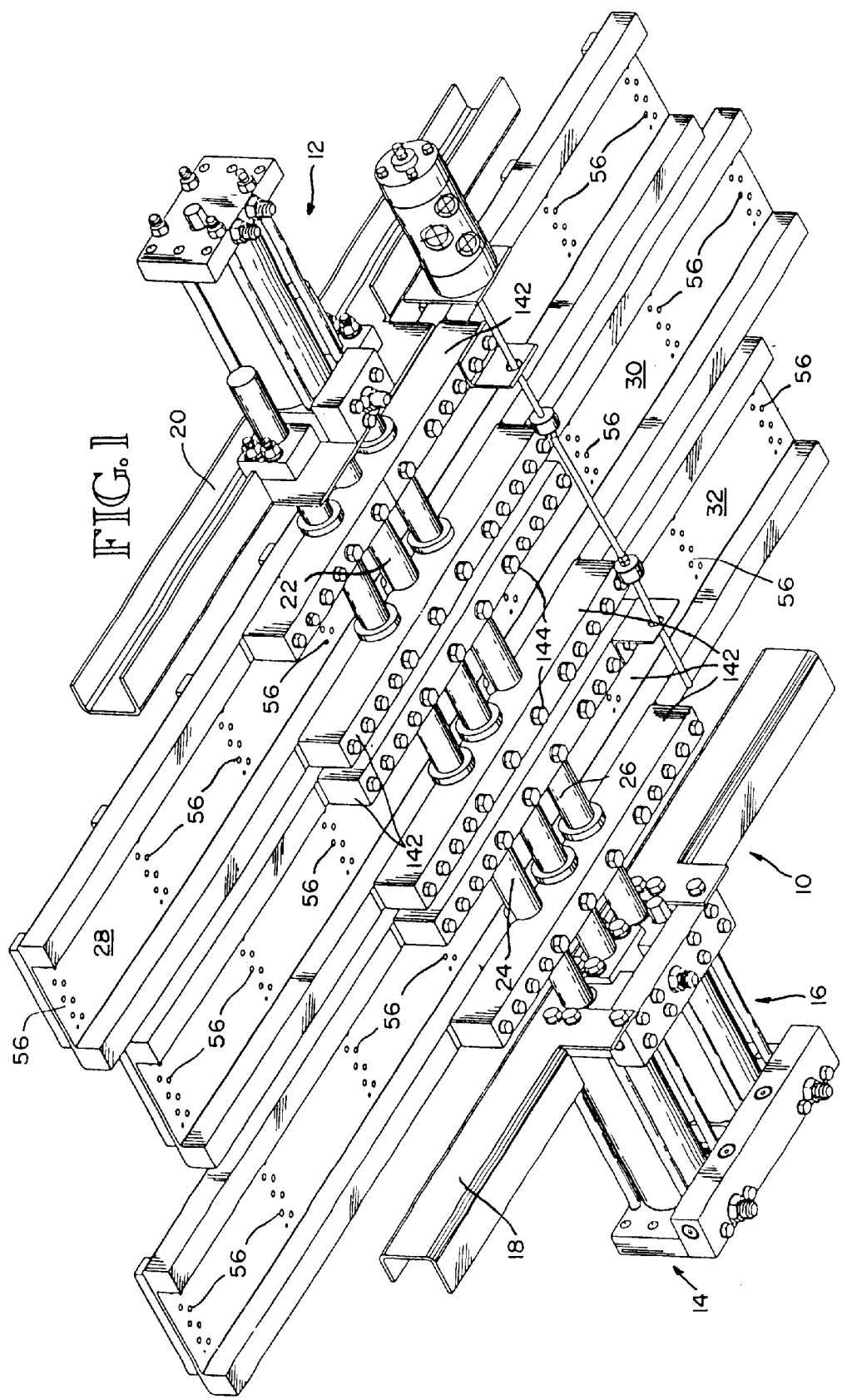

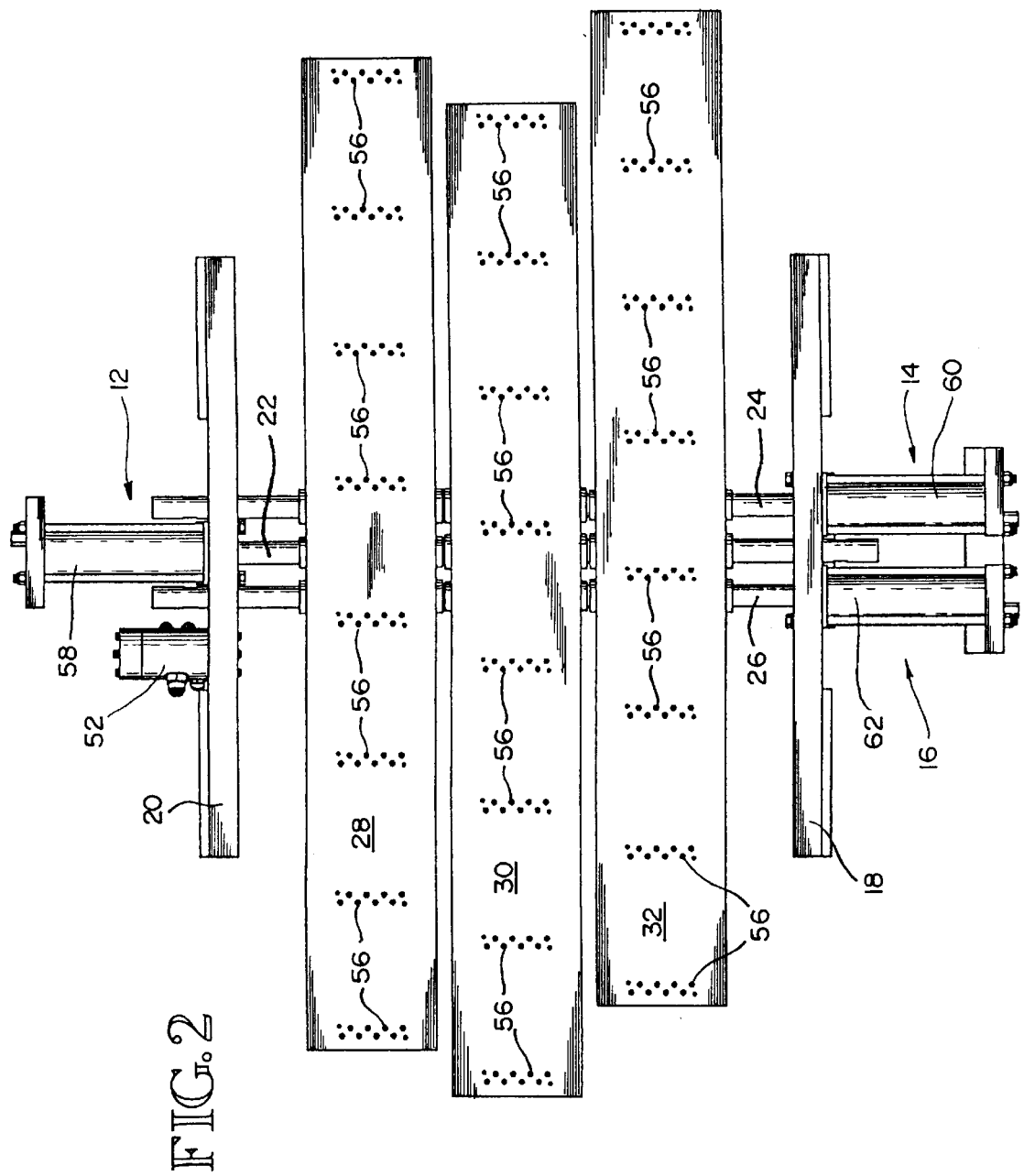

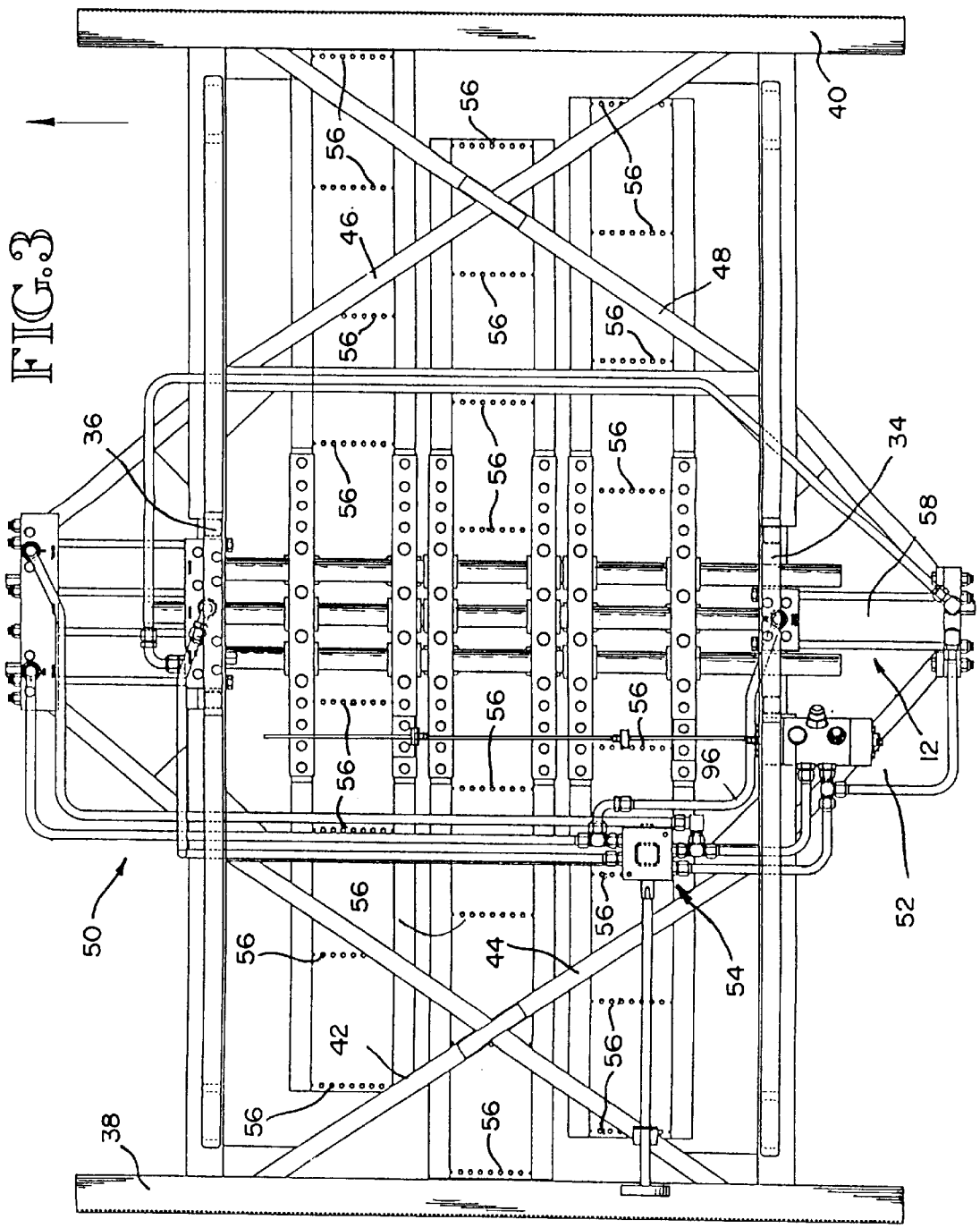

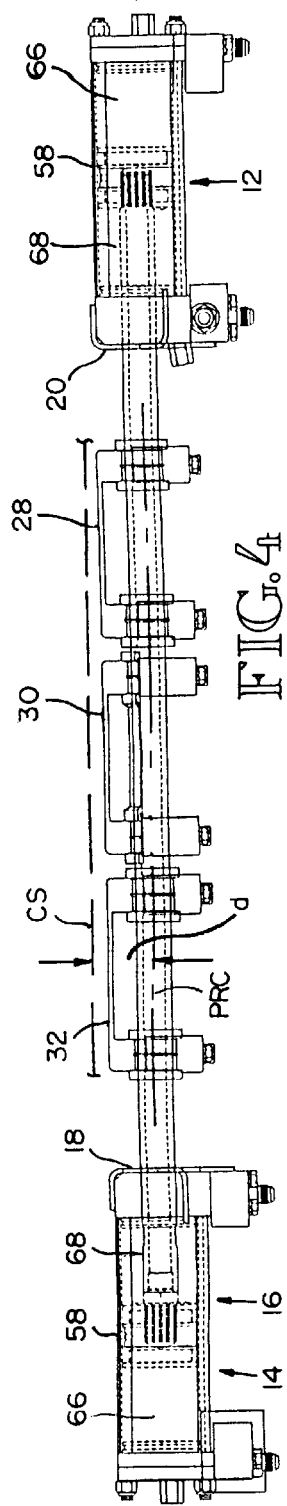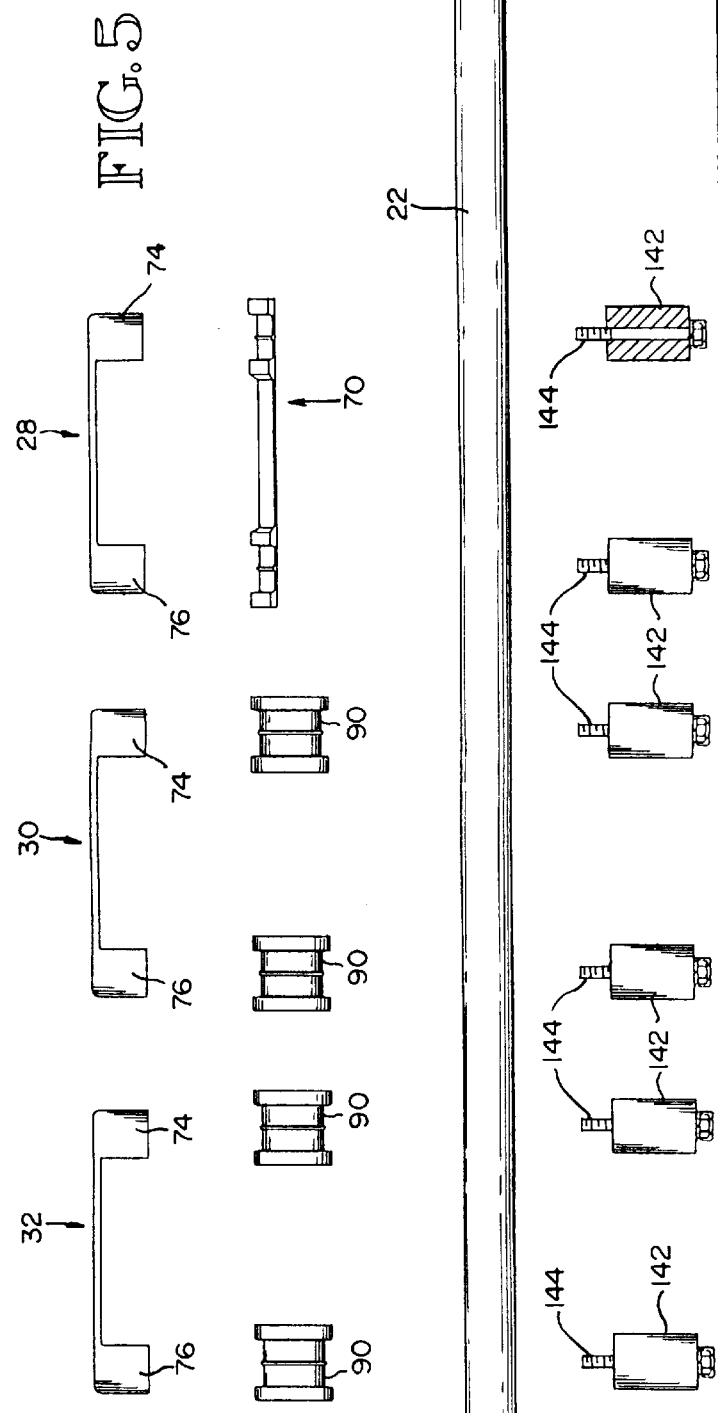

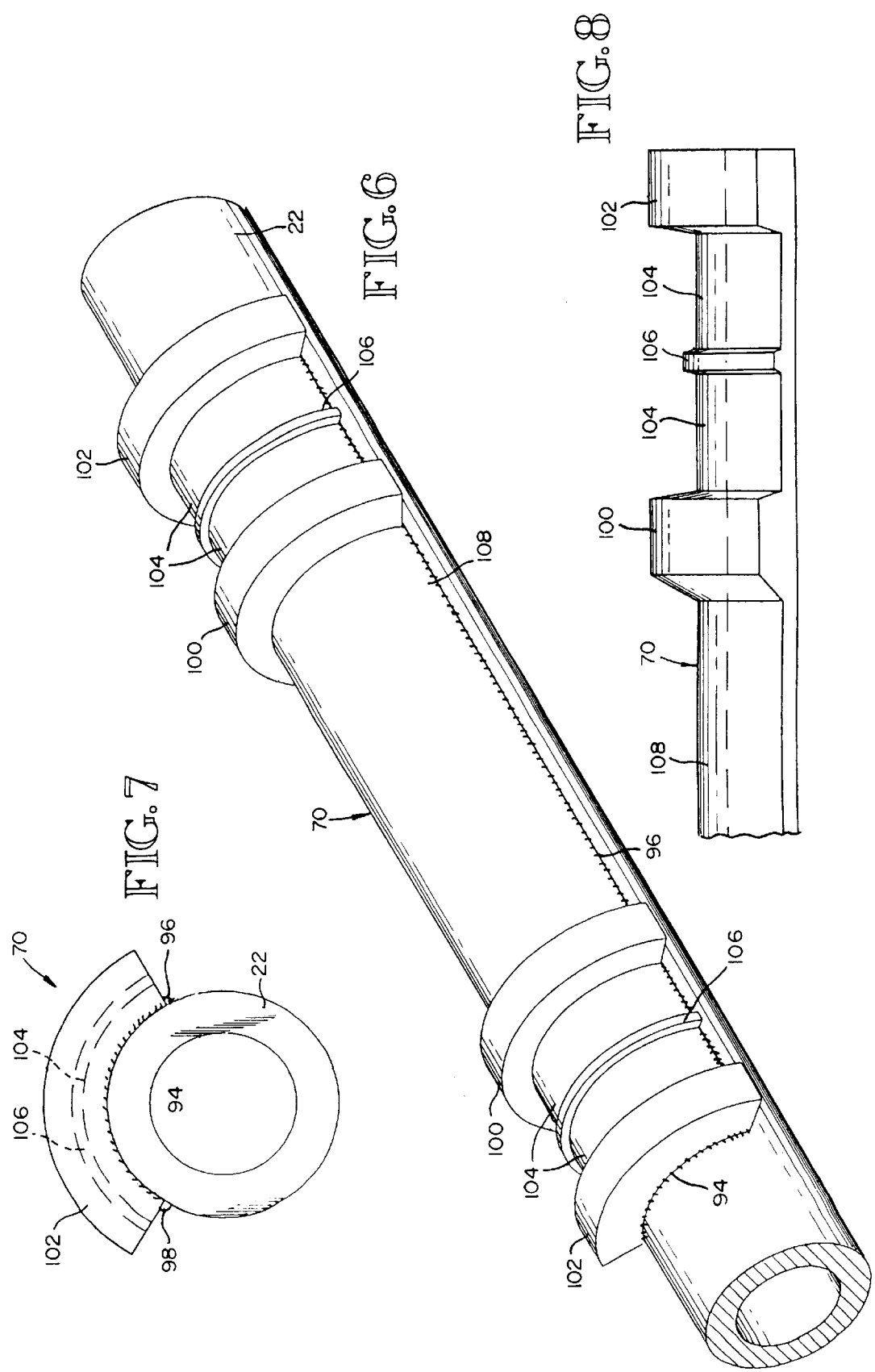

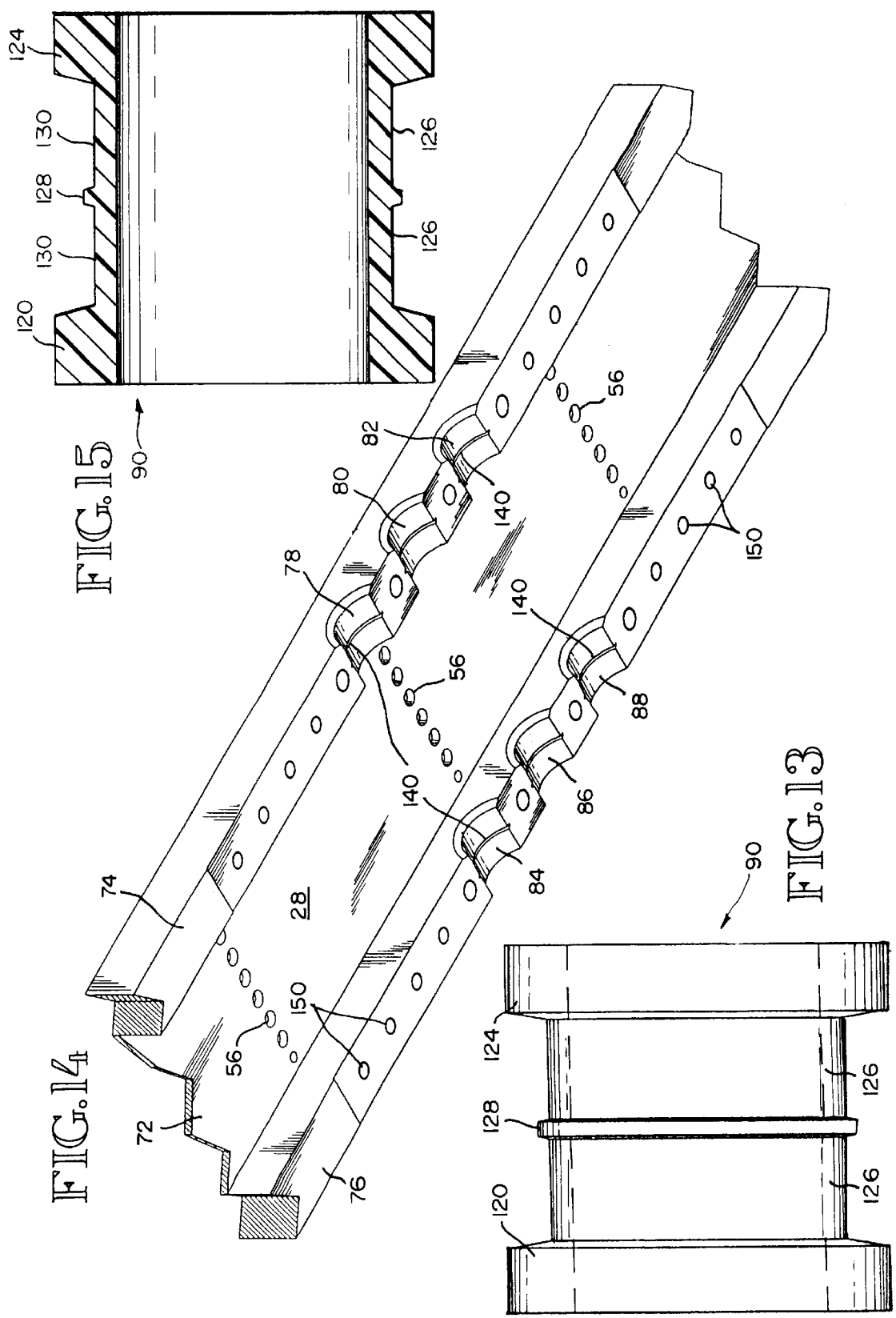

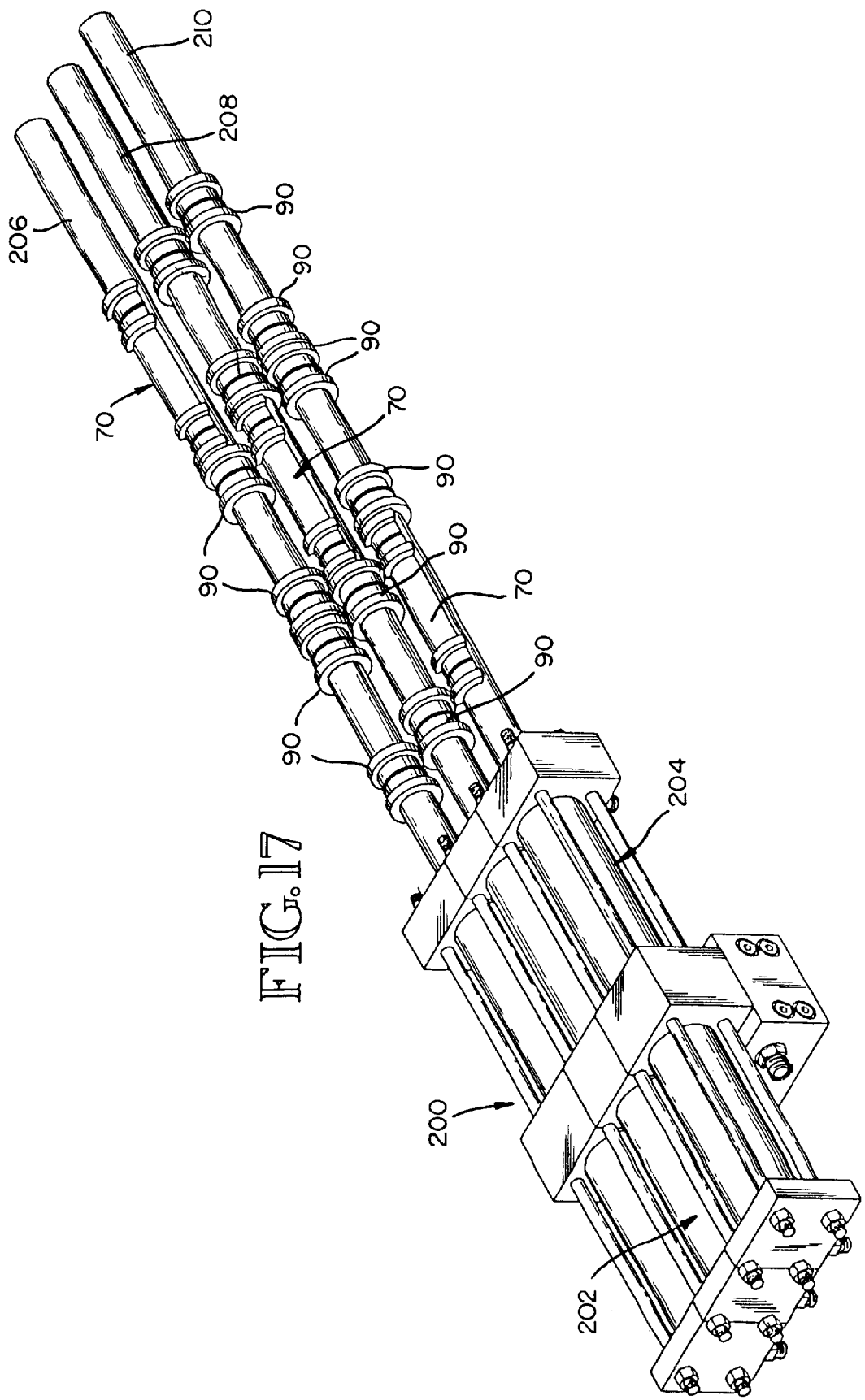

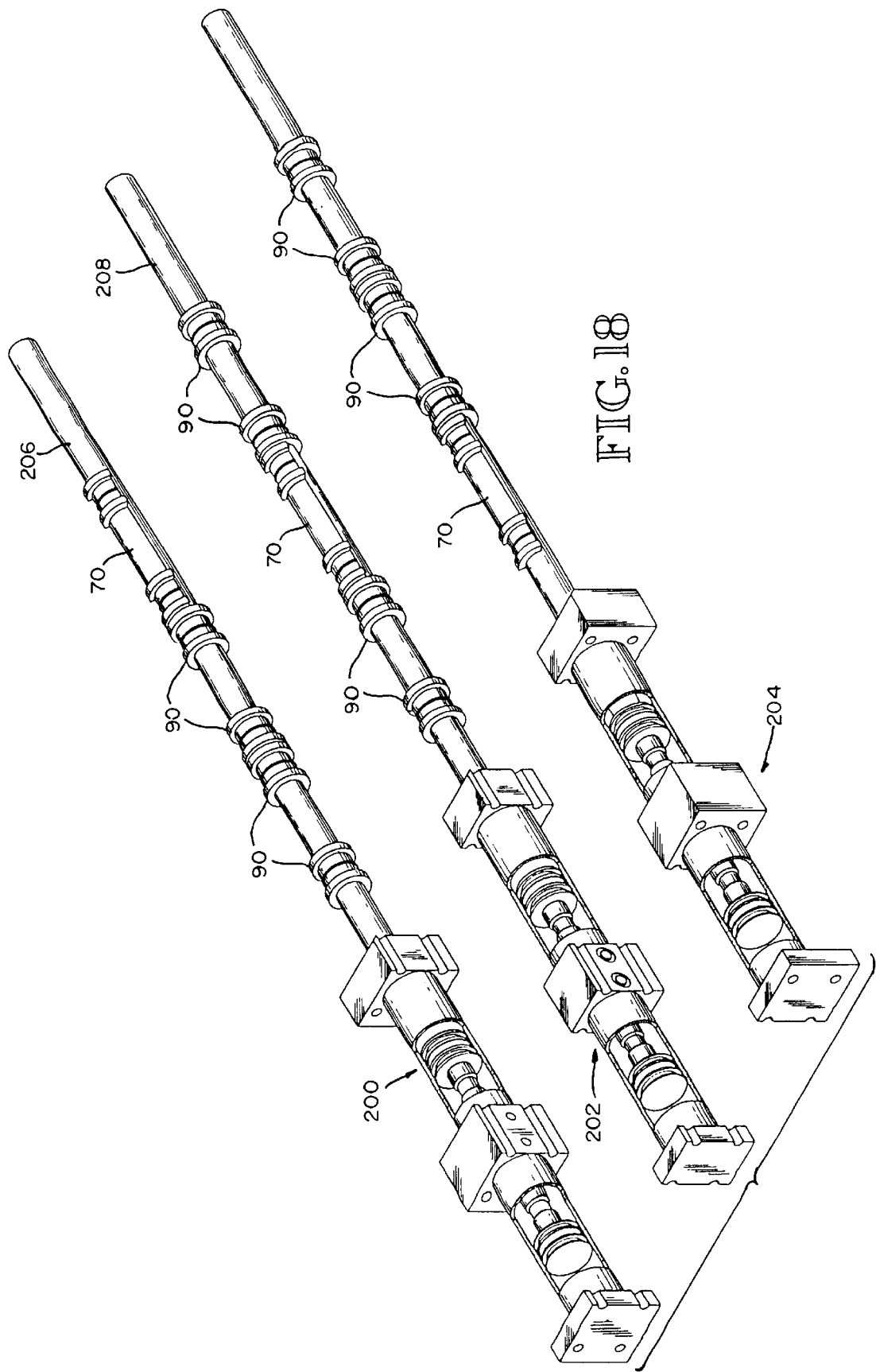

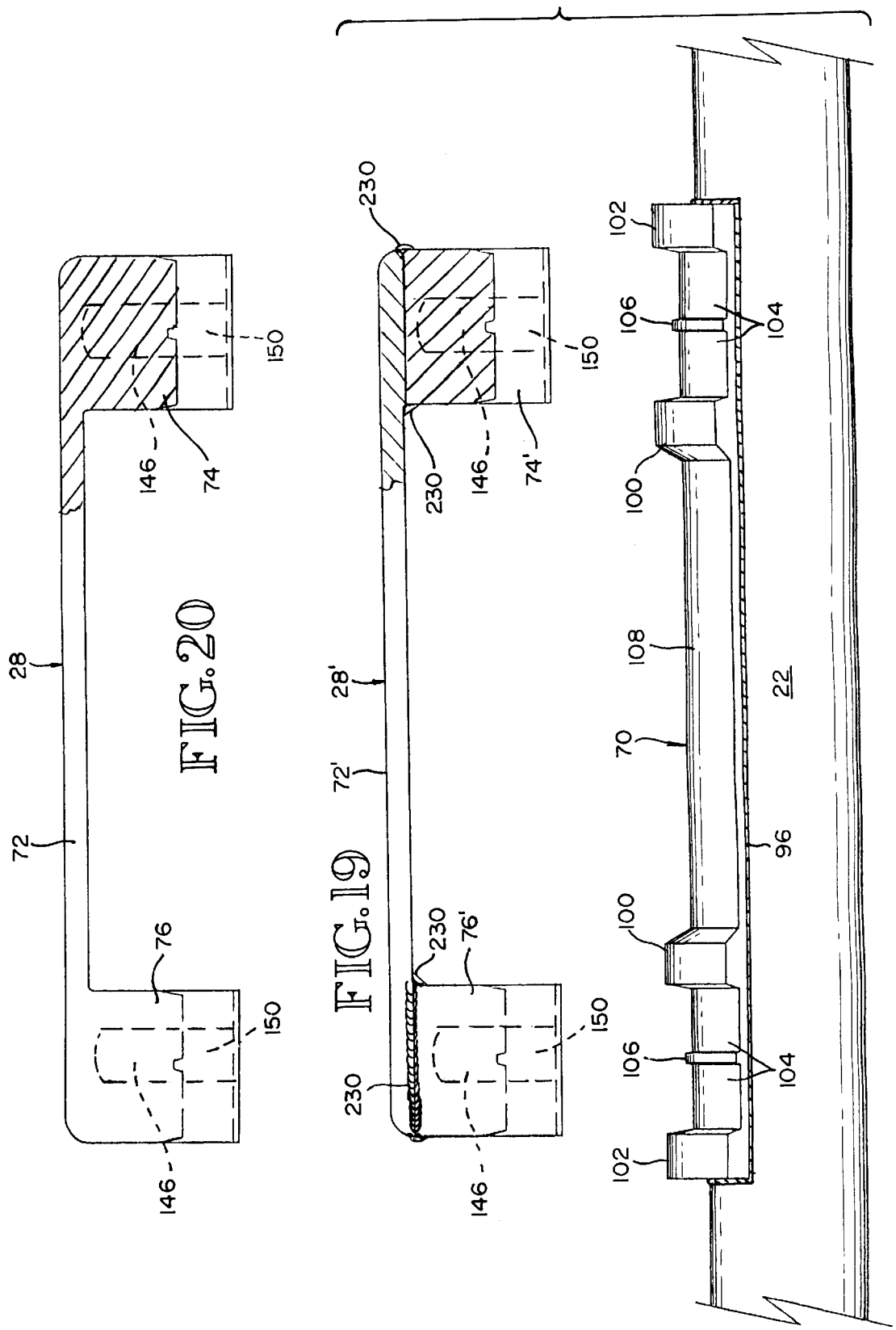

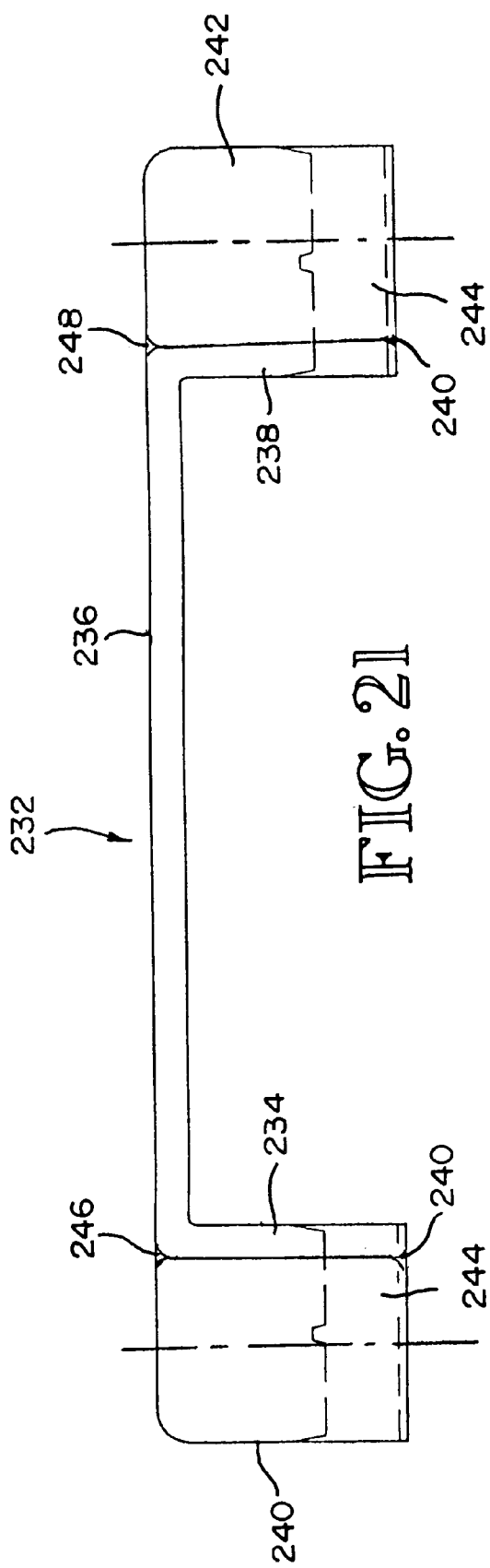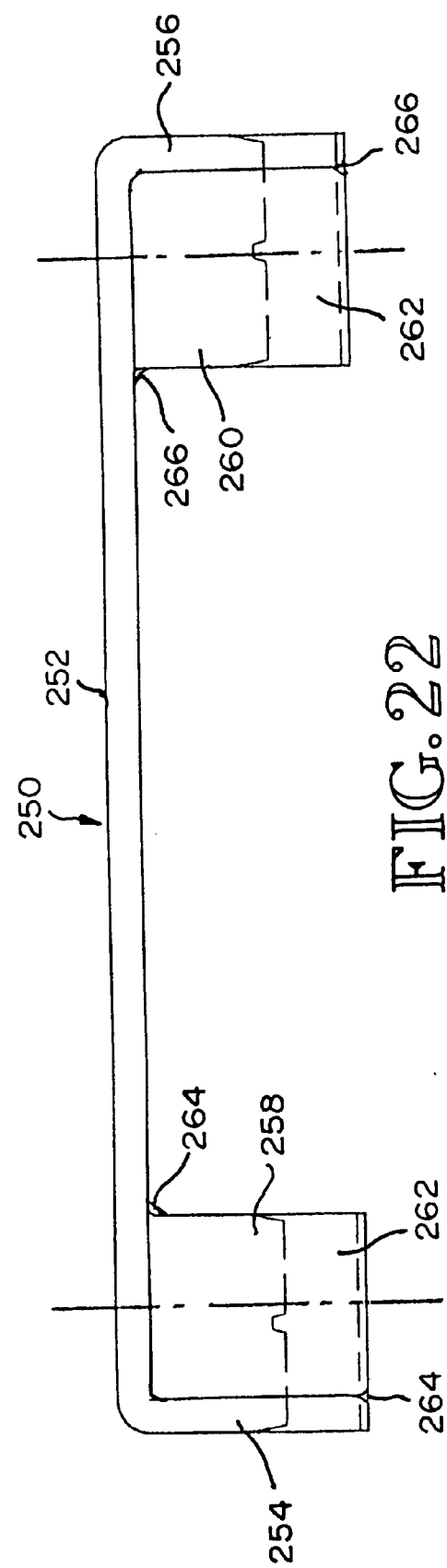

DRIVE BEAM TO DRIVE UNIT CONNECTIONS

TECHNICAL FIELD

This invention relates to reciprocating slat conveyors. More particularly, it relates to drive assemblies comprising a plurality of side-by-side drive beams that extend across a plurality of side-by-side piston rods, and to structure for connecting each drive beam to a related piston rod, and further to bearing structure for guiding each drive beam for relative movement along the drive rods to which it is not connected.

BACKGROUND OF THE INVENTION

A number of prior art reciprocating slat conveyors are discussed in the "Background Art" section of my co-pending application Ser. No. 09/322,721, filed May 28, 1999 and entitled "Drive Beam To Drive Unit Connections." In the prior art connections, it is common to connect a first connector member to a lower part of each drive beam and to provide the first such connector member with a downwardly opening recess. A second connector member is provided below the first connector member. The second connector member includes an upwardly opening recess that confronts the downwardly opening recess in the first connector member. The movable portion of the drive, e.g. the drive rod, is received within the confronting recesses. Bolts extend through openings in the second connector member and thread into threaded openings in the first connector member, for connecting the two connector members together, with the movable portion of the drive units secured between the two connector members. Each drive beam is positioned above the movable portions of the drive units to which it is not connected. As a result, there is no contact between each drive beam and the drive units to which it is not connected.

It is desirable to position the thrust centers of the drive units as close to the plane of the conveyor slats as is possible. An object of this invention is to provide a system for connecting the transverse drive beams to the drive units in a way that moves the longitudinal center or thrust lines of the drive units upwardly into positions that are closer to the conveyor slats than they are in the prior art assemblies.

Another object of the present invention is to provide a system of bearings that guide the transverse drive beams for movement relatively along the movable portions of the drive units to which they are not connected.

A further object of the invention is to brace each transverse drive beam against yaw, pitch and roll movement by use of the drive units to which the drive beam is not connected.

BRIEF SUMMARY OF THE INVENTION

The present invention includes providing reciprocating slat conveyors that are basically characterized by an elongated piston rod and an elongated drive beam that extends perpendicular to the piston rod. The drive beam includes a top and a pair of spaced apart drive-beam flanges depending from opposite side portions of the top. Each drive-beam flange includes a downwardly opening recess sized for receiving an upper portion of a piston rod. A cap member is provided for each drive-beam flange. Each cap member includes an upwardly opening recess sized for receiving a lower portion of the piston rod. Removable connectors connect cap members to the drive-beam flanges, with the piston rod held secure between the cap members and the drive-beam flanges.

According to another aspect of the invention, the piston rod includes at least one radial projection positioned to contact and push against a said drive-beam flange in the region of the recess in the drive-beam flange, during an endwise movement of the piston rod. Preferably, the piston rod includes a first radial projection positioned to contact and push against a said drive-beam flange in the region of the recess in the drive-beam flange, during an endwise movement of the piston rod in a first direction. The piston rod preferably also includes a second radial projection positioned to contact and push against the same drive-beam flange in the region of the recess in such drive-beam flange, during an endwise movement of the piston rod in the opposite direction.

The piston rod may include a main rod body and an arcuate member welded to the main rod body, to provide the first and second radial projections. Preferably, the arcuate member includes a radially outwardly opening recess formed in part by a pair of axially spaced apart, radial projections. This recess receives a portion of a said drive-beam flange. When the drive-beam flange is in the arcuate member recess, portions of the drive-beam flange that border the drive-beam flange recess are contiguous the radial projections on the arcuate member.

The positioning of the downwardly directed recesses in the drive-beam flanges, rather than in a separate member that is attached to the drive-beam flange, raises the thrust centers of the drive units upwardly into positions where they are closer to the conveyor slats than they are in the prior art devices.

In the preferred embodiment, the removable connectors are bolts that extend through openings in the cap members and thread into threaded openings in the drive-beam flanges. Thus, the cap members and the drive-beam flanges are wide enough to accommodate bolt receiving openings and still have sufficient structure outwardly on each side of the bolt receiving opening to give the drive beams the needed strength.

According to another aspect of the invention, each drive beam is provided with additional downwardly opening recesses above the piston rod of each other drive unit. Tubular bearings are provided that include upper portions that are received in the downwardly directed additional recesses in the drive-beam flanges. The cap members include additional upwardly directed recesses that are sized to receive lower portions of the bearings. When the cap members are secured to the drive-beam flanges, the bearings are secured to the drive beams. The bearings include internal surfaces which receive and contact the piston rods of the other drive units. Accordingly, as the drive beams move, they carry with them the bearings and the bearings slide relatively along the portions of the piston rods that are within the bearings.

According to a further aspect of the invention, engagement of each drive beam and its bearings with the drive units to which the drive beam is not connected, braces the drive beam against pitch, yaw and roll movement.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWING

In the drawings, like element designations refer to like parts throughout the several views, and:

FIG. 1 is a pictorial view of a drive assembly for a reciprocating slat conveyor, taken from below and looking towards the bottom, one side and one end of the assembly;

FIG. 2 is a top plan view of the drive assembly shown by FIG. 1;

FIG. 3 is a bottom plan view of the drive assembly shown by FIGS. 1 and 2, to which mounting frame and plumbing structure have added;

FIG. 4 is a side elevational view of the drive assembly shown by FIGS. 1 and 2, taken substantially along line 4—4 of FIG. 2. Such view showing internal portions of the drive units by use of hidden lines;

FIG. 5 is an exploded side elevational view of the central portion of FIG. 4;

FIG. 6 is a fragmentary pictorial view of a region of a piston rod where a transverse drive beam is connected to the piston rod;

FIG. 7 is a cross sectional view taken substantially along line 7—7 of FIG. 9;

FIG. 8 is an enlarged scale side elevational view of an end portion of an interlock structure that is welded to the piston rod and is used for preventing movement of the piston rod relative to its transverse drive beam when a driving force is applied to the piston rod;

is FIG. 13 is an enlarged scale side elevational view of one of the bearings;

FIG. 14 is a fragmentary pictorial view of a transverse drive beam, taken from below and looking up towards the bottom, one sectioned end and one side portion of the drive beam;

FIG. 15 is a longitudinal sectional view of one of the bearings;

FIG. 17 is a pictorial view of a modified assembly of drive units, such assembly including a cylinder component of the drive units at one end of the assembly, and showing the add-on members for engaging the transverse beams and the drive beam bearings installed on the piston rods;

FIG. 18 is a view like FIG. 17, but showing the drive units spaced laterally apart and including cutaway regions in the cylinder component housings, for showing internal structure in the cylinder component housings;

FIG. 19 is an enlarged scale view like FIG. 9, but showing a modified construction of a drive beam in the region where it is attached to its drive rod;

FIG. 20 is a view of the drive beam portion of FIG. 9, showing a portion of the drive beam in section;

FIG. 21 is a view of the drive beam portion of FIG. 19, showing another way of constructing the drive beam; and FIG. 22 is a view like FIG. 21 showing a further way of constructing the drive beam.

DETAILED DESCRIPTION OF THE INVENTION

Figure 9:
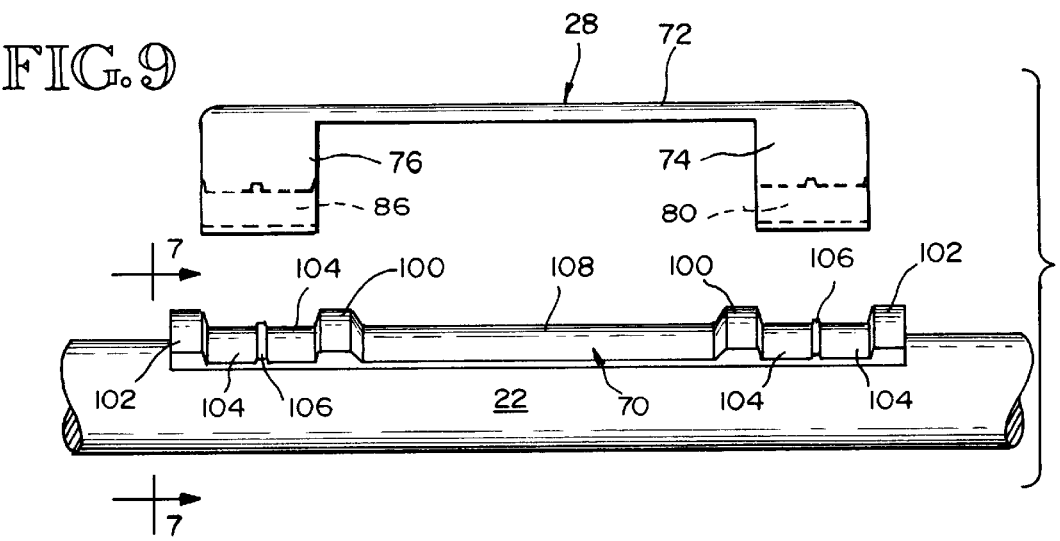
FIG. 9 is a side elevational view of the piston rod and the add-on member that forms the interlock, such view including a cross sectional view of a drive beam spaced vertically from the add-on structure.

Principles that constitute the present invention can best be understood by considering embodiments of the invention and in particular the best mode of the invention. Referring first to FIG. 1, a drive assembly is shown to comprise three linear hydraulic drive units 12, 14, 16. Each drive unit 12, 14, 16 has a fixed portion and a movable portion. The fixed portions are cylinder components that are secured to frame structure in some suitable manner. The movable portions 22, 24, 26 are piston rods that are connected to transverse drive beams 28, 330, 32. Conveyor slats (not shown) are connected to the transverse drives 28, 30, 32. The relationship of the conveyor slats to the transverse drive beams 28, 30, 32, and to a system of support beams and bearings for the conveyor slats, are disclosed by my U.S. Pat. No. 4,823,938, granted Apr. 25, 1989, and entitled "Improved Drive System For A Reciprocating Floor Conveyor." The contents of that patent are hereby incorporated herein by this specific reference.

FIGS. 1 and 2 show mounting frame structure in the form of a pair of longitudinally spaced apart transverse mounting members or beams 18, 20. These mounting members 18, 20 may be used for connecting the drive assembly to a pair of main frame beams that are laterally spaced apart a distance that is narrower than the width of the conveyor. FIG. 3 shows frame structure comprising transverse mounting frame members 34, 36, extending outwardly to the side boundaries of the conveyor to connection with longitudinal frame members 38, 40 at the side boundaries. This frame structure further includes diagonal members 42, 44, 46. FIG. 3 also discloses fluid conduits 50, a switching valve 52 and a direction control valve 54. The frame structure, the conduits and the valves are not a part of the present invention and so they will not be described in any detail.

FIGS. 1–3 show fastener holes 56 in the drive beams 28, 30, 32 where the conveyor slats are connected to the transverse drive beams 28, 30, 32. The connection of the conveyor slats to the transverse drive beam 28, 30, 32 is not a part of the present invention and so the details of these connections are not illustrated or described.

As is well known to those skilled in the art, the conveyor slats (not shown) extend longitudinally of the conveyor and perpendicular to the transverse drive beams 28, 30, 32. One third of the conveyor slats are connected to drive beam 28. A second third are connected to drive beam 30. The remaining conveyor slats are connected to drive beam 32.

As clearly shown by FIGS. 1–3, the transverse drive beams 28, 30, 32 extend parallel to each other and perpendicular to the piston rods 22, 24, 26. Piston rod 22 has a first end that in known fashion is connected to a piston head 58 that is housed within a cylinder barrel portion 60 of drive unit 12 (FIG. 4). The piston rod 22 extends from the piston head endwise outwardly from the cylinder barrel 60. In similar fashion, piston rod 24 is connected to a piston head 58 that is within cylinder barrel 60 of drive unit 14. Piston rod 26 is connected to a piston head 58 that is within cylinder barrel 62 of drive unit 16. Each piston head 58 divides the interior of its cylinder barrel 60, 62, 64 into two working chambers 66, 68 (FIG. 4). As is well known, the introduction of fluid pressure into one of the chambers 66, 68 and the release of fluid pressure from the other chamber causes an axial movement of the piston head and piston rod relative to the cylinder barrel.

FIG. 5 shows the three transverse drive beams 28, 30, 32 spaced above piston rod 22. It further shows a member 70 that is adapted to be welded to the piston rod 22. Additional members 70 of like construction are provided for connection to the other two piston rods 24, 26.

All three connections of the drive beams 28, 30, 32 to the piston rods 22, 24, 26 are the same. Accordingly, only one of these connections will be described. It is the connection of transverse drive beam 28 to its piston rod 22. It is to be understood, however, that the connection of drive beam 30 to its piston rod 24 and the connection of drive beam 32 to its piston rod 26 are the same as the connection of the drive beam 28 to the piston rod 22.

Firstly, the preferred construction of the drive beams 28, 30, 32 will be described. Referring to FIG. 14, drive beams 28, 30, 32 each have a relatively thin top wall 72 and a pair of relatively wide flanges 74, 76 that depend from the top 72 along the opposite sides of the drive beam 28. In the preferred embodiment, top 72 and flanges 74, 76 are milled from a single piece of structural aluminum alloy. It is provided in the form of a solid plank. A milling machine or the like is used for cutting a longitudinal groove or channel in the plank, to form the top 72 and the side flanges 74, 76. Preferably, the milled member 72, 74, 76 has a substantially constant cross sectional shape throughout the full length of the beam 28 except for where each side flange 74, 76 is provided with three downwardly directed recesses. The downwardly directed recesses in flange 74 are designed 78, 80, 82. The downwardly directed recesses in flange 76 are designated 84, 86, 88. Recesses 80, 86 are adapted to receive end portions of a member 70 that is welded to the piston rod 22. Recesses 78, 82, 84, 88 each receive portions of a bearing 90.

Figure 16:
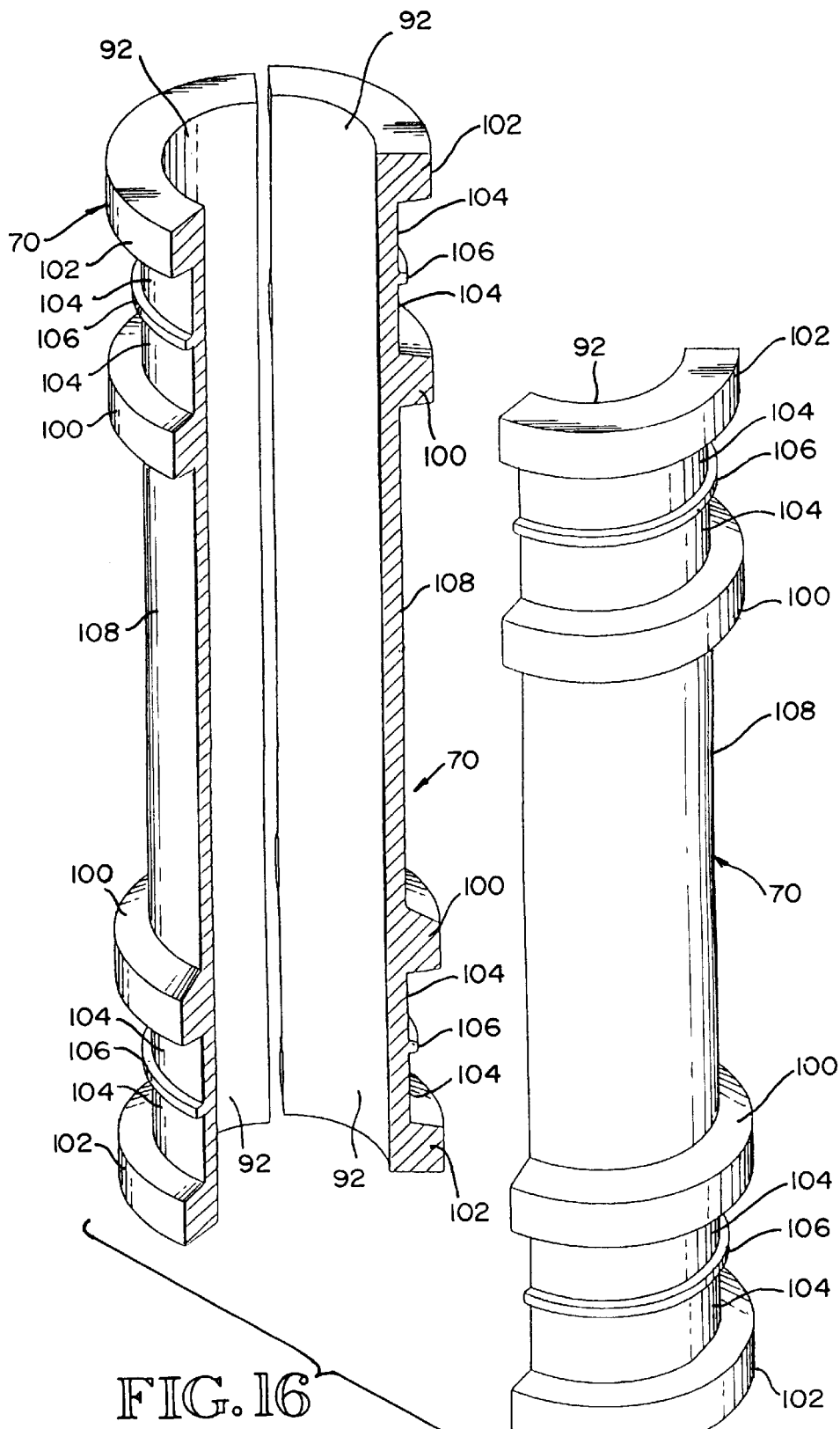
FIG. 16 is a pictorial view of a tubular machined part that forms three of the add-on structures for the piston rod, such view showing the structure longitudinally divided into three parts and showing one of the three parts spaced laterally from the other two parts.

Referring to FIG. 16, a cylindrical member may be turned on a lathe, to give it a desired external configuration. Then, it is separated longitudinally into three pieces, each of which becomes one of the members 70. Each member 70 has a concave inner surface 92 that conforms in curvature to the outer surface of its piston rod 22, 24, 26. FIG. 6 shows a member 70 positioned on piston rod 22. Preferably, the member 70 is welded to the piston rod 22 at its ends 94 and at its sides 96, 98. As best shown by FIGS. 6 and 8, each member 70 has end portions that include a pair of radially outwardly projecting flanges 100, 102 that project radially outwardly from a relatively thin base wall 104. A smaller flange or rib 106 projects radially outwardly from the base 104 substantially equidistance between the flanges 100, 102. Preferably, member 70 includes a relatively thin central portion 108 that is preferably about equal in thickness to the base portions 104.

Figure 10:
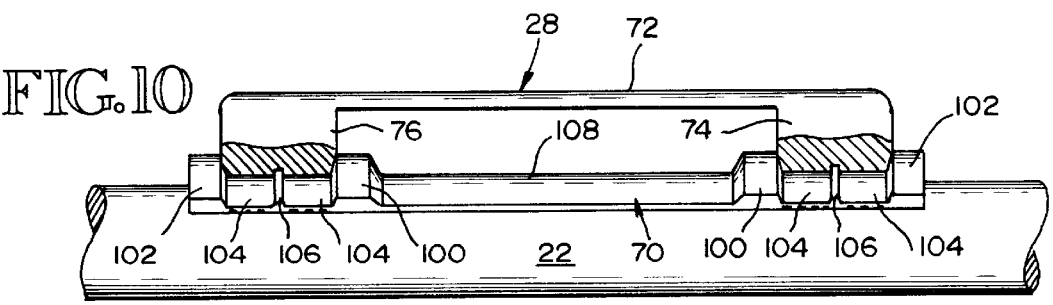
FIG. 10 is a view like FIG. 9, but showing the drive beam engaging the add-on structure to the piston rod.
Figure 11:
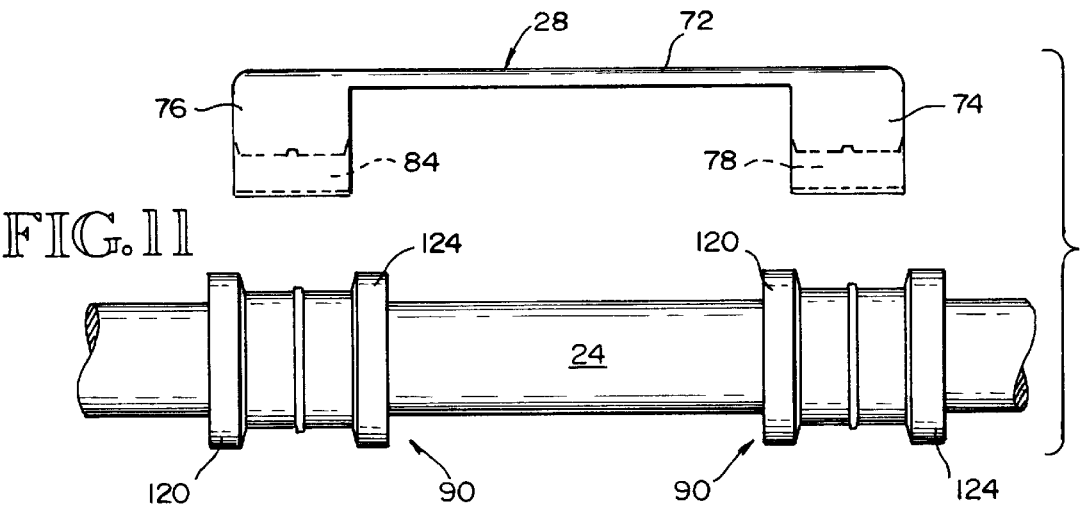
FIG. 11 is a view like FIG. 9, but showing a pair of bearings on the piston rod and a transverse drive beam spaced from the bearings and piston rod.
Figure 12:
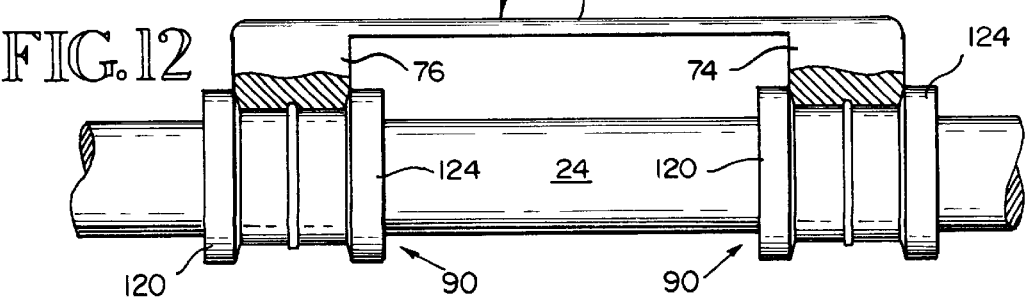
FIG. 12 is a view like FIG. 11, but showing the transverse drive beam engaging the bearings, with one of the bearing regions shown in cross section and the other in side elevation.

The bearings 90 have a cross sectional shape or profile that is substantially identical to the cross sectional shape or profile of an end portion of a member 70. With respect to the members 70, this profile extends only one third of the distance around the piston rod. In the case of the bearings is 90, this cross sectional shape or profile extends a full 360° around the bearing. As shown by FIGS. 13 and 15, each bearing 90 comprises end flanges 120, 124 that project radially outwardly from a relatively thin base portion 126. A circumferential rib 128 projects radially outwardly from the longitudinal center of the base portion 126. FIG. 11 shows drive beam 28 positioned above piston rod 24, with a pair of bearings 90 being positioned on the piston rod 24 below the recesses 78, 84 in the flanges 74, 76 of the drive beam 28. FIG. 12 shows the recess regions 74, 76 of the drive beam 28 positioned downwardly within the space that is between the bearing flanges 120, 124. The add-on members 70 provide outwardly opening recesses above the base walls 104 and between the flanges 100, 102. In identical fashion, bearings 90 include a relatively thin base or base wall 130 that extends axially between the flanges 120, 124. The rib 128 projects radially outwardly from the base wall 130. Portions of the drive beam 28 that immediately border the recesses 80, 86 fit down into the radially outwardly opening recesses between flanges 100, 102 in the members 70. In like fashion, portions of the drive beam flanges 74, 76 that immediately surround the recesses 78, 84 and immediately surround the recesses 82, 88 fit within the radially outwardly opening recesses in the bearing 90. This is shown by FIGS. 10 and 12. As clearly shown by FIG. 14, the recesses 78, 80, 82, 84, 86, 88 include circumferential grooves 140 that are sized and positioned to receive the ribs 106, in the case of recesses 80, 86, and the ribs 128 in the case of the recesses 78, 84 and 82, 88.

Each transverse drive beam 28, 30, 32 is provided with a pair of cap members. The cap members are identical and so each one is designated 142. Each cap member 142 includes a roll of bolt openings, each sized to receive a bolt 144.

Referring to FIGS. 19 and 20, for example, the drive beam flanges include internally threaded bolt receiving openings 146. The drive beam flanges 74, 76 and the cap members 142 are wide enough to include the bolt openings 150 and still have a sufficient amount of metal on opposite sides of the bolt openings 150 to provide the flanges 74, 76 and the cap members 142 with sufficient strength.

The placement of the recesses 78, 80, 82, 84, 86, 88 in the drive beam flanges 74, 76, moves the piston rod upwardly towards the drive-beam top 72. Referring to FIG. 4, the general plane of the conveyor slat is designated CS. The piston rod center line is designated PRC. This is the thrust line or the center of thrust of the drive unit. The present invention reduces the dimension d which is the vertical distance between the general plane of the conveyor slat CS and the thrust line PRC. An upper portion of each piston rod is positioned in each recess 78, 80, 82, 84, 86, 88. The upper portion of the piston rod 22 in the recesses 80, 82 includes a member 70. The end portions 100, 102, 104, 106 of the members 76 fit into the recesses 80, 86. The piston rods associated with the recesses 78, 84 and 82, 86 are provided with bearings 90 that are received within the recesses 78, 82, 84, 86. The cap members 142 have upwardly opening recesses (FIG. 1) that complement the downwardly opening recesses 78, 80, 82, 84, 86, 88 in the drive beam flanges 74, 76. When the cap members 142 are brought into position relative to the piston rods 22, 24, 26 and the drive beam flanges 74, 76, a lower portion of piston rod 22 will be received within the center recesses for the cap members 142 that are associated with drive beam 28.

The lower portions of bearings 90 on the other two piston rods 24, 26 will be received within the cap member recesses for the same cap members. FIG. 1 shows that the cap members for drive beam 30 receives the lower portions of bearings 90 for piston rods 22, 24. The cap members 142 associated with drive beam 32 receive lower portions of bearings 90 for piston rods 22, 26. The members 70 together with the complementary recesses and the bolts 144 firmly connect drive beam 28 to piston rod 22, drive beam 30 to piston rod 26 and drive beam 32 to piston rod 24. When drive beam 28 reciprocates back and forth between the frame members 18, 20, for example, the bearings 90 that is carries mounts it for guided movement along the piston rods 24, 26. This arrangement also braces the drive beam 28 against yaw, roll and pitch movement. When drive beam 30 reciprocates back and forth due to longitudinal movement of piston rod 26, drive beam 30 is guided by the bearings 90 that is carries for longitudinal movement along the piston rods 22, 24. It is also braced against yaw, roll and pitch movement. When drive beams 32 reciprocates in response to longitudinal reciprocating of piston rod 24, the bearings 90 that it carries guide it for longitudinal movement along the piston rod 22, 26. Drive beam 32 is also braced against yaw, roll and pitch movement by the bearings and the piston rods 22, 26.

The operation cycle is well described in the aforementioned U.S. Pat. No. 4,823,938. Accordingly, it will not be repeated here.

FIGS. 17 and 18 disclose a modified drive unit assembly. This assembly has three tandem cylinders 200, 202, 204 connected to common ends of piston rods 206, 208, 210. Piston rod 206 is provided with four bearings 90 and an arcuate member 70. Piston rod 208 is provided with four bearings 90 and a member 70. Piston rod 210 is provided with four bearings 90 and a member 70. The members 70 are like member 70 shown in FIGS. 9 and 10 and is discussed above with respect to FIGS. 9 and 10. The bearings 90 are like bearings disclosed in FIGS. 11 and 12 and discussed above in connection with FIGS. 11 and 12. The use of tandem cylinders is disclosed in my U.S. Pat. No. 5,638,443, granted Jun. 17, 1997 and entitled Drive Assembly For Reciprocating Slat Conveyor. The system shown by FIGS. 17 and 18 is an example of a system that places the cylinder bodies at a common end of the three piston rods 206, 208, 210. The embodiment shown by FIGS. 1–3 places two cylinder bodies 14, 16 at one end and the third cylinder body 12 at the opposite end of the drive assembly.

FIG. 20 presents an end elevational view of drive beam 28, with a portion shown in section above a recess 150. FIG. 19 shows a similar drive beam 28'. This drive beam 28' is made in three pieces. There is a separate top 72' and two flanges 74', 76' that are formed separate from the top 72'. The top end flanges are then welded together at 230.

FIG. 21 shows a drive beam 232 that is formed from a central channel member 234, 236, 238 to which members 240, 242 have been added. Members 240, 242 extend throughout at least the central region of the drive beam 232. This is the region that includes all of the downwardly opening recesses 244. Member 240 is outside of flange 234 and is welded to flange 234. Member 242 is outside of flange 238 and is welded to flange 238, at 248. Member 234 may be termed an inner flange part and member 240 may be termed an outer flange part. In similar fashion, member 238 may be termed an inner flange part and member 242 may be termed an outer flange part. Together, members 232, 240 are about the width of flanges 74, 74', 76, 76'. The flange assembly 234, 240 includes three downwardly opening recesses 244 that are like recesses 78, 80, 82 in FIG. 14. Flange assembly 238, 242 includes three downwardly opening recesses that are like recesses 84, 86, 88 in FIG. 14. As illustrated, the recesses 244 have the same configuration as recesses 78, 80, 82, 84, 86, 88.

FIG. 22 shows another way of constructing the drive beams. In this embodiment, drive beam 250 is shown to be constructed from a channel member 252, 254, 256 that is the full width of the drive beam 34. It is provided with additional flange parts 258, 260. Flange parts 258, 260 extend at least as long as the central portions of the drive beams 250 that include the downwardly opening recesses 262. In this embodiment, the additional flange members 258, 260 are inside of the channel flange members 254, 256, whereas in FIG. 21 the additional flange members 240, 242 were on the outside of the channel flange members 234, 238. Flange member 256 is welded to the channel member 252, 254 at 264. The flange member 260 is welded to the channel members 252, 256 at 266. The combined widths of the flange parts 254, 258 and 256, 260 are preferably identical to the widths of the flanges 74, 76. The downwardly directed recesses 262 are preferably identical in shape to the recesses 78, 80, 82, 84, 86, 88.

It is possible to make the drive beams in a number of other ways. For example, the drive beams can be made from tubular stock to which either outside or inside flange parts have been added so as to provide a total flange structure capable of receiving downwardly opening recesses of the type that have been described. If tubular stock is used, it will be necessary to cut through the bottom wall of the tubular members where the piston rods pass. Or, the bottom walls can be replaced by corrugated walls or other suitable recessed wall where the piston rod must pass through the lower regions of the drive beams.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A reciprocating slat conveyor, comprising:
   an elongated piston rod;
   an elongated drive beam extending perpendicular to the piston rod, said drive beam including a top and a pair of spaced apart drive-beam flanges depending from opposite side portions of the top, each said drive-beam flange including a downwardly opening recess sized for receiving an upper portion of the piston rod;
   a cap member for each drive-beam flange, each said cap member including an upwardly opening recess sized for receiving a lower portion of the piston rod; and
   removable connectors for connecting the cap members to the drive-beam flanges with the piston rod held secure between the cap members and the drive-beam flanges.

2. The conveyor of claim 1, wherein the piston rod includes at least one radial projection positioned to contact and push against a said drive-beam flange in the region of the recess in the drive-beam flange, during an endwise movement of the piston rod.

3. The conveyor of claim 1, wherein the piston rod includes a first radial projection positioned to contact and push against a said drive-beam flange in the region of the recess in the drive-beam flange, during an endwise movement of the piston rod in a first direction, and a second radial projection positioned to contact and push against a said drive-beam flange in the region of the recess in the drive-beam flange, during an endwise movement of the piston rod in the opposite direction.

4. The conveyor of claim 1, wherein the piston rod includes a main rod body and an arcuate member welded to the main rod body, said arcuate member including a radially outwardly opening recess formed in part by a pair of axially spaced apart, radial projections, said piston rod recess receiving a said drive-beam flange recess, with portions of the drive-beam flange that border the drive-beam flange recess being contiguous the radial projections on the arcuate member.

5. The conveyor of claim 4, wherein the arcuate member includes an arcuate base that is axially between the two radial projections, said outwardly opening recess being formed above the arcuate base.

6. The conveyor of claim 5, wherein the arcuate base of the arcuate member includes a circumferentially extending rib, and wherein the drive-beam flange that is received in said drive-beam flange recesses includes a complementary circumferential groove which receives the circumferential rib on the arcuate base portion of the arcuate member.

7. The conveyor of claim 6, wherein the removable connectors are bolts that extend through openings in the cap members and thread into threaded openings in the drive-beam flanges.

8. The conveyor of claim 1, wherein the removable connectors are bolts that extend through openings in the cap members and thread into threaded openings in the drive-beam flanges.

9. The conveyor of claim 8, wherein the piston rod includes at least one radial projection positioned to contact and push against a said drive-beam flange in the region of the recess in the drive-beam flange, during an endwise movement of the piston rod.

10. The conveyor of claim 8, wherein the piston rod includes a first radial projection positioned to contact and push against a said drive-beam flange in the region of the recess in the drive-beam flange, during an endwise movement of the piston rod in a first direction, and a second radial projection positioned to contact and push against a said drive-beam flange in the region of the recess in the drive-beam flange during an endwise movement of the piston rod in the opposite direction.

11. The conveyor of claim 1, wherein the top and the flanges are formed together from a single piece of metal.

12. The conveyor of claim 11, wherein the metal is a structural aluminum alloy and the top and the flanges are formed by milling an aluminum alloy plank.

13. The conveyor of claim 11, wherein the drive-beam flanges project below the top a distance at least equal to five times the thickness of the top of the drive beam, and wherein the removable connectors are bolts that extend through openings in the cap members and thread into threaded openings in the drive-beam flanges.

14. The conveyor of claim 13, wherein the drive-beam flanges have a width that is at least six times the thickness of the top of the drive beam.

15. The conveyor of claim 1, wherein the top of the drive beam and the drive-beam flanges are separate members that are connected together, and the member forming the top extends over the tops of the members that form the flanges.

16. The conveyor of claim 1, wherein the flanges are composed of a first flange part that is formed integral with the top of the drive beam and a second flange part that is connected to the first flange part and is positioned on one side of the first flange part.

17. The conveyor of claim 16, wherein the second flange part is outside of the first flange part.

18. The conveyor of claim 16, wherein the second flange part is inside the first flange part.

19. The conveyor of claim 17, wherein the removable connectors are bolts that extend through openings in the cap members and thread into threaded openings in the second flange parts.

20. The conveyor of claim 18, wherein the removable connectors are bolts that extend through openings in the cap members and thread into threaded openings in the second flange parts.

21. A drive assembly for a reciprocating slat conveyor, comprising:
   a plurality of parallel, hydraulic drive units, each having a longitudinally movable piston rod;
   a plurality of transverse drive beams, one for each drive unit;
   each said drive beam extending across all of the piston rods;

each said drive beam being rigidly connected to a related one of the drive beams and movable relatively along each other piston rod;

each said drive beam carrying a tubular bearing for each piston rod that it extends across and to which it is not connected, each said bearing being secured to its drive beam and being movable with its drive beam relatively along a related piston rod; and said related piston rod extending through the bearing.

22. The drive assembly of claim 21, wherein each drive beam includes a top and a pair of spaced apart drive-beam flanges depending from opposite side portions of the top, each said drive-beam flange including a downwardly opening recess; a cap member for each drive-beam flange, each said cap member including an upwardly opening recess; removable connectors for connecting the cap members to the drive-beam flanges with the upwardly opening recesses in the cap members confronting the downwardly opening recesses in the drive-beam flanges; wherein in each said drive beam that moves relatively along a related piston rod the recesses in the drive-beam flanges are sized for receiving an upper portion of a bearing, and the recesses in the cap members are sized for receiving a lower portion of a bearing; and wherein a said bearing is received within each confronting pair of recesses.

23. The drive assembly of claim 22, wherein each bearing has radially outwardly projecting end flanges and a radially outwardly opening bearing recess between its end flanges; wherein each bearing recess receives a portion of a drive-beam flange that borders a downwardly opening recess in such flange and a portion of a cap member that borders an upwardly opening recess in the cap member; and wherein contact between the drive-beam flange and the cap member and the end flanges on the bearing hold the bearing against movement relative to the drive beam and cap member.

24. The drive assembly of claim 21, wherein each drive beam includes a top and a pair of spaced apart drive-beam flanges depending from opposite side portions of the top, each said drive-beam flange including a downwardly opening recess; a cap member for each drive-beam flange, each said cap member including an upwardly opening recess, removable connectors for connecting the cap members to the drive-beam flanges with the upwardly opening recesses in the cap members confronting the downwardly opening recesses in the drive-beam flanges; and wherein the piston rods are received within the confronting recesses in the drive-beam flanges and the cap members.

25. The drive assembly of claim 24, wherein for each drive beam the piston rod to which the drive beam is rigidly connected includes at least one radial flange positioned to contact and push against a said drive-beam flange in the region of the recess in the drive-beam flange, during an endwise movement of the piston rod.

26. The drive assembly of claim 24, wherein each tubular bearing surrounds its piston rod and includes radial flanges at its ends that contact portions of the drive-beam flanges and the cap member which immediately border the confronting recesses.

* * * * *